US009892826B2

(12) United States Patent
Teshima et al.

(10) Patent No.: US 9,892,826 B2
(45) Date of Patent: Feb. 13, 2018

(54) ELECTRIC WIRE STRUCTURE AND METHOD FOR ELECTROMAGNETIC SHIELDING OF ELECTRIC WIRE

(71) Applicant: MITSUBISHI AIRCRAFT CORPORATION, Aichi (JP)

(72) Inventors: Kazunori Teshima, Tokyo (JP); Katsuya Kitazume, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 31 days.

(21) Appl. No.: 14/613,547

(22) Filed: Feb. 4, 2015

(65) Prior Publication Data

US 2015/0232197 A1    Aug. 20, 2015

(30) Foreign Application Priority Data

Feb. 18, 2014    (JP) .................................. 2014-28918

(51) Int. Cl.
| | |
|---|---|
| *H01B 9/02* | (2006.01) |
| *B64D 27/18* | (2006.01) |
| *H01B 7/00* | (2006.01) |
| *H02G 3/32* | (2006.01) |

(52) U.S. Cl.
CPC ............. *H01B 9/025* (2013.01); *B64D 27/18* (2013.01); *H01B 7/0045* (2013.01); *H02G 3/32* (2013.01); *Y02T 50/44* (2013.01); *Y10T 29/49194* (2015.01)

(58) Field of Classification Search
CPC .......... H01B 9/02; H01B 9/023; H01B 9/024; H01B 9/025; H01B 9/026; H01B 9/028; H01B 7/22; H01B 7/226; H01B 7/28; H01B 7/40; B64D 45/02; B64D 29/00; B64D 29/02; B64D 29/06; B64D 27/18

USPC .......... 174/32, 34, 36, 350, 68.1, 24, 102 R, 174/108, 113 R, 112

See application file for complete search history.

(56) References Cited

U.S. PATENT DOCUMENTS

| | | | | |
|---|---|---|---|---|
| 1,818,423 | A | * | 8/1931 | Mummert |
| 2,166,420 | A | * | 7/1939 | Robertson |
| 2,286,827 | A | * | 6/1942 | Morrison ............... H01B 7/041 |
| | | | | 156/55 |

(Continued)

FOREIGN PATENT DOCUMENTS

| | | | |
|---|---|---|---|
| JP | 10088085 A | * | 4/1998 |
| JP | 2006024372 A | | 1/2006 |

(Continued)

OTHER PUBLICATIONS

Japanese Office Action for Japanese Patent Application No. 2014-028918 dated Oct. 24, 2017.

*Primary Examiner* — Walter L Lindsay, Jr.
*Assistant Examiner* — Milton Gonzalez
(74) *Attorney, Agent, or Firm* — Pearne & Gordon LLP (57) ABSTRACT

An electric wire structure keeps down the weight and improves the ease of routing, as well as allows an existing electric wire to be easily provided with measures against electromagnetic waves. The electric wire structure includes: a single or plurality of electric wires; a single or plurality of GND members which are disposed around the electric wires along the electric wires and are grounded at both ends; and a bundling member for directly bundling the electric wires and the GND members which are not covered integrally by a jacket.

19 Claims, 9 Drawing Sheets

(56) References Cited

U.S. PATENT DOCUMENTS

| | | | | |
|---|---|---|---|---|
| 3,032,604 | A * | 5/1962 | Timmons | H01B 11/1016 174/107 |
| 3,927,247 | A * | 12/1975 | Timmons | H01B 11/1826 174/107 |
| 4,189,807 | A * | 2/1980 | Byerly | |
| 4,368,613 | A * | 1/1983 | Sanchez | H01B 11/1025 174/36 |
| 5,467,941 | A * | 11/1995 | Chee | B64D 27/18 |
| 5,694,510 | A * | 12/1997 | Sano | G02B 6/4459 174/70 A |
| 6,580,915 | B1 * | 6/2003 | Kroll | G01S 5/14 455/279.1 |
| 2004/0057176 | A1 * | 3/2004 | Dhawan | |
| 2007/0087632 | A1 * | 4/2007 | Fong | H01B 11/1066 439/607.41 |
| 2010/0051743 | A1 * | 3/2010 | Dumont | |
| 2010/0297873 | A1 * | 11/2010 | Burke | |
| 2010/0319989 | A1 * | 12/2010 | Huang | |

FOREIGN PATENT DOCUMENTS

| | | | |
|---|---|---|---|
| JP | 2011115315 A * | 6/2011 | |
| JP | 2012056284 A | 3/2012 | |
| JP | 5061114 B2 | 10/2012 | |
| JP | 2013214690 A | 10/2013 | |

* cited by examiner

ELECTRIC WIRE STRUCTURE AND METHOD FOR ELECTROMAGNETIC SHIELDING OF ELECTRIC WIRE

BACKGROUND OF THE INVENTION

Field of the Invention

The present invention relates to an electric wire structure, an aircraft engine pylon, an aircraft, and a method for electromagnetic shielding of an electric wire.

Description of the Related Art

An aircraft is provided with a large number of electric wires (cables) for supplying electric power to various pieces of equipment or transmitting signals. For example, electric power generated by a generator installed in the engine is delivered to a power supply device provided in the airframe through an electric power line which is routed from the generator through the engine pylon to the airframe.

In an aircraft, provisions against lightning strikes are important. When lightning strikes, a high lightning current flows through the airframe. It is desirable to protect the electrical system from strong electromagnetic waves generated by the current.

Other than electromagnetic waves generated by lightning strikes, electromagnetic waves emitted from a radar of an airport control tower and electronic devices equipped in the aircraft also affect the aircraft.

Moreover, electric wires carrying alternating currents are not only affected by electromagnetic waves from the outside, but these electric wires also radiate electromagnetic waves and affect external devices.

In order to reduce the influence of electromagnetic waves, a twisted pair wire, a shielded electric wire having a shield member such as a metal braid wound around a core wire, etc. are commonly used.

There is also known a motor drive cable (Japanese Patent No. 5061114) in which return lines for returning to an inverter a high-frequency current leaking from a plurality of core wires which supply a drive current to a three-phase motor, are disposed between adjacent ones of the core wires.

The conventional electric wires provided with measures against electromagnetic waves, including twisted pair wires, shielded electric wires, and the electric wire shown in Japanese Patent No. 5061114, all have a jacket (sheath) which surrounds and integrates the core wire, the metal braid, the return line, etc. Having the jacket, the conventional electric wires provided with measures against electromagnetic waves are heavy in weight. It is desirable in aircrafts, for which weight reduction is a crucial issue, to implement measures against electromagnetic waves while minimizing the weight.

In addition, when provided with a jacket, the electric wire becomes less flexible and accordingly becomes less easy to route. The requirement for the ease of routing of an electric wire is high in an aircraft, as it is a large structure compared with a car etc., and an intricate narrow path continues over a long distance, for example, from the engine generator through the engine pylon to the main wing. Not only in aircrafts but also especially in large structures, there is a high requirement for the ease of routing of an electric wire.

When providing an existing electric wire with measures against electromagnetic waves, it is necessary to remove the existing electric wire and replace it with an electric wire provided with measures against electromagnetic waves, which takes enormous time and effort.

In view of the above problems, the present invention aims to provide an electric wire structure and a method for electromagnetic shielding of an electric wire which can keep down the weight and improve the ease of routing, as well as allows an existing electric wire to be easily provided with measures against electromagnetic waves.

SUMMARY OF THE INVENTION

An electric wire structure of the present invention includes: a single or plurality of electric wires to be provided; a single or plurality of GND (ground) members which are disposed around the electric wires along the electric wires and are grounded at both ends; and a bundling member for directly bundling the electric wires and the GND members which are not covered integrally by a jacket.

According to the electric wire structure of the present invention, an electromagnetic shielding effect can be obtained as a current flows through the GND members when the electric wires are irradiated with electromagnetic waves.

Unlike the common electric wires with a jacket which are an integral structure, the electric wire structure of the present invention has no jacket, which makes it lightweight.

Since the electric wires and the GND members are only bundled by the bundling member, the electric wires and the GND members can be handled individually.

In the present invention, therefore, it is possible not only to dispose the GND members along the entire length of the electric wires, but also to dispose the GND members only in those sections of the wiring path of the electric wires where it is necessary to reduce the influence of electromagnetic waves.

Moreover, it is possible to dispose the number of GND members just enough to obtain the electromagnetic shielding effect.

Thus, it is possible to give an electromagnetic shielding effect to the electric wires while minimizing the weight.

According to the present invention, it is also possible to provide various types of electromagnetic-shielded electric wire structures according to the application such as electric power supply or signal transmission to arbitrary devices by combining electric wires of various standards with the GND members.

Since the electric wire structure of the present invention has no jacket and hence is highly flexible, the ease of routing can be improved compared with the common electric wires with a jacket.

Moreover, since the electric wire structure has no jacket and allows the electric wires and the GND members, which are elements configuring the electric wire structure, to be handled individually, it is possible to add the GND members to an existing electric wire and turn it into an electromagnetic-shielded electric wire.

If one removes an existing electric wire and newly designs and lays an electromagnetic-shielded electric wire, one would have a hard time removing the electric wire by sorting it out from other wires running on the same path, and one would also have to have the newly designed electromagnetic-shielded electric wire approved by the Civil Aviation Bureau.

According to the present invention, it is possible to configure the electromagnetic-shielded electric wire structure by combining already approved elements (electric wires and GND members) without removing the existing electric wire.

Other than a conductor (electric wire) having a conductive property, a braid formed from a conductor etc. can be used as the GND member of the present invention.

In the following, where the GND member is an electric wire extending along the above-described electric wire, the GND member will be referred to as a GND line.

In the electric wire structure of the present invention, it is preferable that a plurality of electric wires is twisted together, and that the GND lines are disposed inside grooves which are formed between adjacent ones of the plurality of electric wires.

Then, the GND lines can be easily disposed along the spiral grooves.

In the electric wire structure of the present invention, it is preferable that the GND line has a core wire and an insulative coating covering the outer periphery of the core wire.

Then, there are the typically provided coating of the core wire of the electric wire and the coating of the GND line lying between the core wire of the electric wire and the core wire of the GND line. Therefore, even when vibration is added to the electric wire structure of the present invention, causing the electric wire and the GND line to rub against each other and wear the coatings away, it is possible to avoid short-circuit between the core wires due to wear more reliably than in the case where only the electric wire is provided with a coating.

It is preferable that the electric wire structure of the present invention includes a string-shaped or belt-shaped first winding part which is wound around the plurality of electric wires on the inner peripheral side of the GND lines.

Then, it is possible to block the GND lines from entering the central part surrounded by the plurality of electric wires by the first winding part. Therefore, it is possible to retain the GND lines around the electric wires so as to favorably exert the electromagnetic shielding effect of the GND lines.

In order to block the GND lines from entering the central part surrounded by the plurality of electric wires along the entire length of the GND lines, it is preferable that the first winding part is provided at a plurality of positions at intervals in the length direction of the GND lines.

It is preferable that the electric wire structure of the present invention includes a string-shaped or belt-shaped second winding part which is wound around the electric wires and the GND lines.

Then, even when the repulsive force of the first winding part acts in the direction of disengaging the GND lines from the grooves formed between the adjacent electric wires, the GND lines along with the first winding part are pressed toward the inner peripheral side by the second winding part, so that the GND lines are retained inside the grooves between the adjacent electric wires.

Therefore, the GND lines are unlikely to be separated from the electric wires but are reliably retained along the electric wires.

It is preferable that the second winding part is provided at a plurality of positions at intervals in the length direction of the GND lines so that it can press the GND lines along their entire length.

Here, the bundling member for bundling the electrical wires and the GND lines may double as the second winding part.

In the electric wire structure of the present invention, it is preferable that at least one of the first winding part and the second winding part is formed using a silicone rubber.

Silicone rubber is excellent in resistance to environmental conditions such as temperature. It is also excellent in slipperiness which is important for routing the electric wire. If at least one of the first winding part and the second winding part is formed using silicone rubber, since the bundled electric wires can be moved smoothly in the direction in which they are pulled during routing of the electric wires, it is easy to route the electric wires and the electric wires are not subjected to unnecessary stress.

It is preferable that the second winding part is lapped over the outer periphery of the first winding part.

Then, compared with the case where the second winding part is provided at positions different from those of the first winding part, the number of positions where the first and second winding parts give frictional resistance to the electric wires and the GND lines is smaller, so that the flexibility of the electric wire structure can be maintained favorably.

In the case where the second winding part is provided at a plurality of positions, only those second winding parts provided at some of the positions may be lapped over the outer periphery of the first winding part.

The electric wire structure of the present invention can be suitably provided in an aircraft.

An aircraft engine pylon of the present invention includes: a structural member for supporting an aircraft engine on a main wing; a pylon fairing covering the structural member; and the above-described electric wire structure, wherein the electric wire structure is provided in the structural member on the inside of the pylon fairing.

Since the above-described electric wire structure is included, the same advantages as those described above can be obtained.

In the engine pylon of the present invention, it is preferable that the pylon fairing is formed from a fiber-reinforced resin containing glass fiber.

Then, it is possible to realize a significant weight reduction, compared with the case where the pylon fairing is formed from a metal material, while providing an electric wire, which may be exposed to electromagnetic waves through the pylon fairing, with measures for electromagnetic shielding through the above-described electric wire structure.

In the engine pylon of the present invention, it is preferable that a mesh member 61 formed from a metal material is provided on the surface of the pylon fairing.

Then, since the mesh member 61 provides an effect of shielding electromagnetic waves, the effect of electromagnetic shielding of the electric wire provided on the inside of the pylon fairing can be enhanced.

An aircraft of the present invention includes the above-described electric wire structure.

In that case, the electric wire in the above-described electric wire structure may be an electric power line which transmits electric power generated by a generator equipped in the aircraft engine via the engine pylon supporting the engine on the main wing.

It is possible to secure power transmission from the engine generator by placing the GND members along sections which are likely to be subjected to electromagnetic waves in such an electric power line.

The following method for electromagnetic shielding of an electric wire can provide the above-described electromagnetic wire structure.

A method for electromagnetic shielding of an electric wire of the present invention includes: a first step of disposing a single or plurality of GND members, which are grounded at both ends, around a single or plurality of electric wires along the electric wires; and a second step of directly bundling the electric wires and the GND members, which are not covered integrally by a jacket, with a bundling member.

According to the present invention, it is possible to provide a lightweight electric wire structure, as it has no jacket unlike the common electric wires with a jacket which are an integral structure.

In the present invention, since the electric wires and the GND members can be handled individually, it is possible to dispose the number of GND members just enough to obtain the electromagnetic shielding effect in only those sections where it is necessary to reduce the influence of electromagnetic waves in the wiring path of the electric wires.

Therefore, it is possible to provide electric wires with an electromagnetic shielding effect while minimizing the weight.

Moreover, since the electric wire structure provided by the present invention has no jacket and hence is highly flexible, the ease of routing can be improved compared with the common electric wires with a jacket.

In the method for electromagnetic shielding of an electric wire of the present invention, it is preferable that, in the first step, GND lines which are electric wires extending along the electric wire are disposed as the GND members.

In the method for electromagnetic shielding of an electric wire of the present invention, it is preferable that, in the first step, the GND lines are disposed inside grooves which are formed between adjacent ones of the plurality of electric wires twisted together.

In the method for electromagnetic shielding of an electric wire of the present invention, it is preferable that, in the first step, a GND line is used which has a core wire and an insulative coating covering the outer periphery of the core wire.

In the method for electromagnetic shielding of an electric wire of the present invention, it is preferable that, in the first step or prior to the first step, a string-like or belt-like first winding part, which is wound around the plurality of electric wires, is provided on the inner peripheral side of the GND lines.

In the first step, one can proceed with the work of providing the first winding part on the inner peripheral side of the GND lines concurrently with the work of disposing the GND lines around the electric wires. The first winding part may be inserted between the electric wires and the GND lines disposed around the electric wires.

It is also possible to wind the first winding part around the electric wires prior to the first step of disposing the GND lines.

It is preferable that the method for electromagnetic shielding of an electric wire of the present invention includes a third step of winding a string-like or belt-like second winding part around the electric wires and the GND lines.

In the third step, it is preferable that the second winding part is lapped over the outer periphery of the first winding part.

In the method for electromagnetic shielding of an electric wire of the present invention, the first step can be performed on an existing electric wire.

In that case, in the second step, the GND members should be passed on the inside of the bundling member bundling the electric wires. Then, the electric wires and the GND members are bundled by the bundling member.

Since the electric wire structure provided by the present invention has no jacket and allows the electric wires and the GND members, which are elements configuring the electric wire structure, to be handled independently, it is possible to add the GND members to an existing electric wire to turn it into an electromagnetic-shielded electric wire.

According to the present invention, it is possible to configure the electromagnetic-shielded electric wire structure by combining already approved elements without removing the existing electric wire.

The method for electromagnetic shielding of an electric wire of the present invention can be suitably performed on electric wires provided in an aircraft.

According to the present invention, it is possible to keep down the weight of the electric wire structure and improve the ease of routing of the electric wire, as well as to easily provide an existing electric wire with measures against electromagnetic waves.

DETAILED DESCRIPTION OF THE PREFERRED EMBODIMENTS

In the following, embodiments of the present invention will be described with reference to the accompanying drawings.

Figure 1:
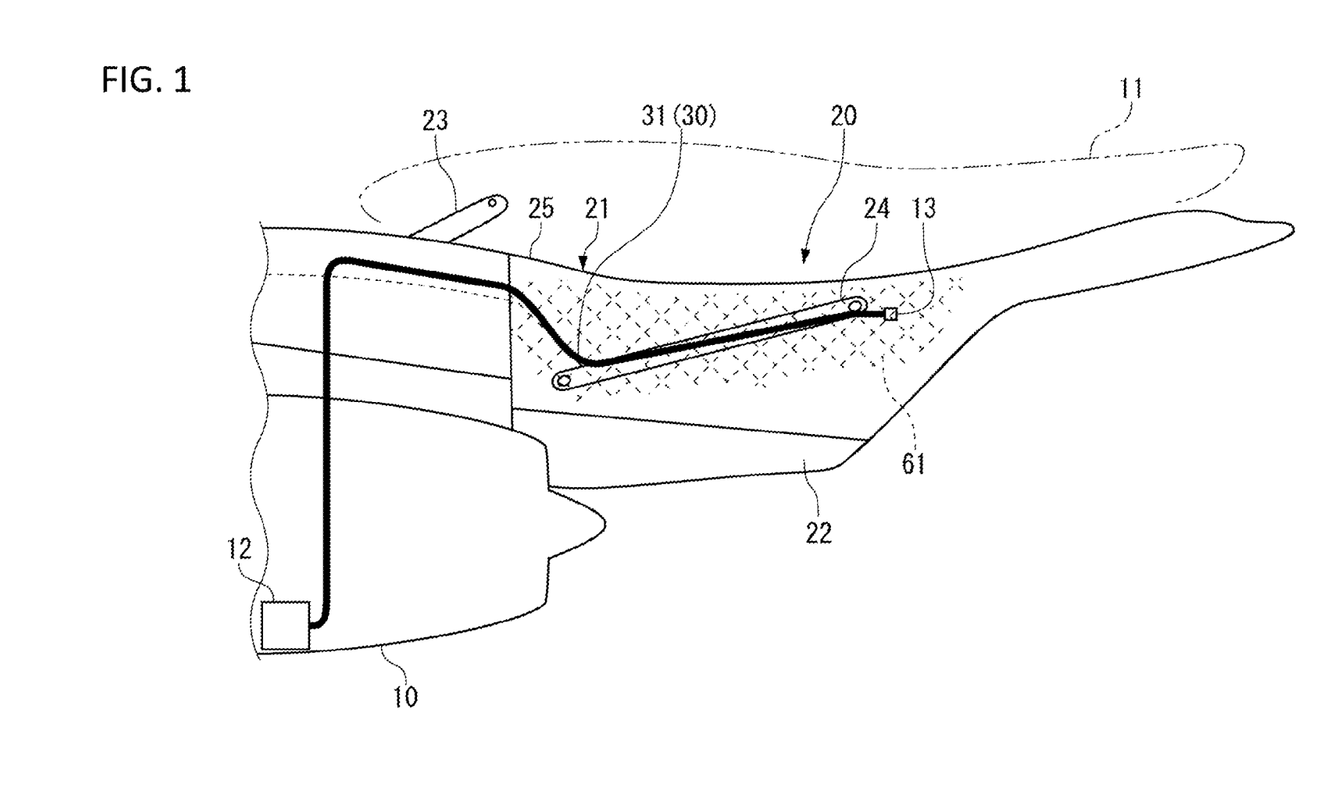
FIG. 1 is a view showing how an electric power line is routed from an aircraft engine through a pylon to an airframe in an embodiment of the present invention.

An aircraft engine 10 shown in FIG. 1 is supported on a main wing 11 through a pylon 20.

The pylon 20 includes a structural member 21 and a pylon fairing 22 covering the structural member 21. FIG. 1 shows the structural member 21 lying on the inside of the pylon fairing 22 seen through it. That is, only part of the pylon fairing 22 is shown.

The structural member 21 includes two rods 23, 24 and a frame 25 which is a box-shaped structure.

The engine 10 includes a generator 12. Three-phase alternating-current power generated by the generator 12 is delivered through an electric power line 31 (power feeder) to a power supply device (not shown) provided in the airframe.

The electric power line 31 extends from the engine 10 toward the pylon 20 and is drawn into the pylon 20. Then, the electric power line 31 is routed toward the main wing 11 along the rod 24 lying on the rear side of the rod 23. A terminal 13 provided at the terminal end of the electric power line 31 is connected with a terminal (not shown) provided in the main wing 11.

It is not absolutely necessary to route the electric power line 31 along the rod 24, and it is also possible to provide the electric power line 31 along the inner wall of the frame 25 etc.

Measures against lightning strikes are important in an aircraft.

For example, when the nacelle of the engine 10 is hit by lightning, a high lightning current flows from the nacelle of the engine 10 through the structural member 21 of the pylon 20 to the main wing 11. Then, a magnetic field is caused around the electric circuit through which the lightning current flows, and electromagnetic waves are generated. It is necessary to block these electromagnetic waves from acting on the electric power line 31 and causing failure of the electrical system.

Figure 2:
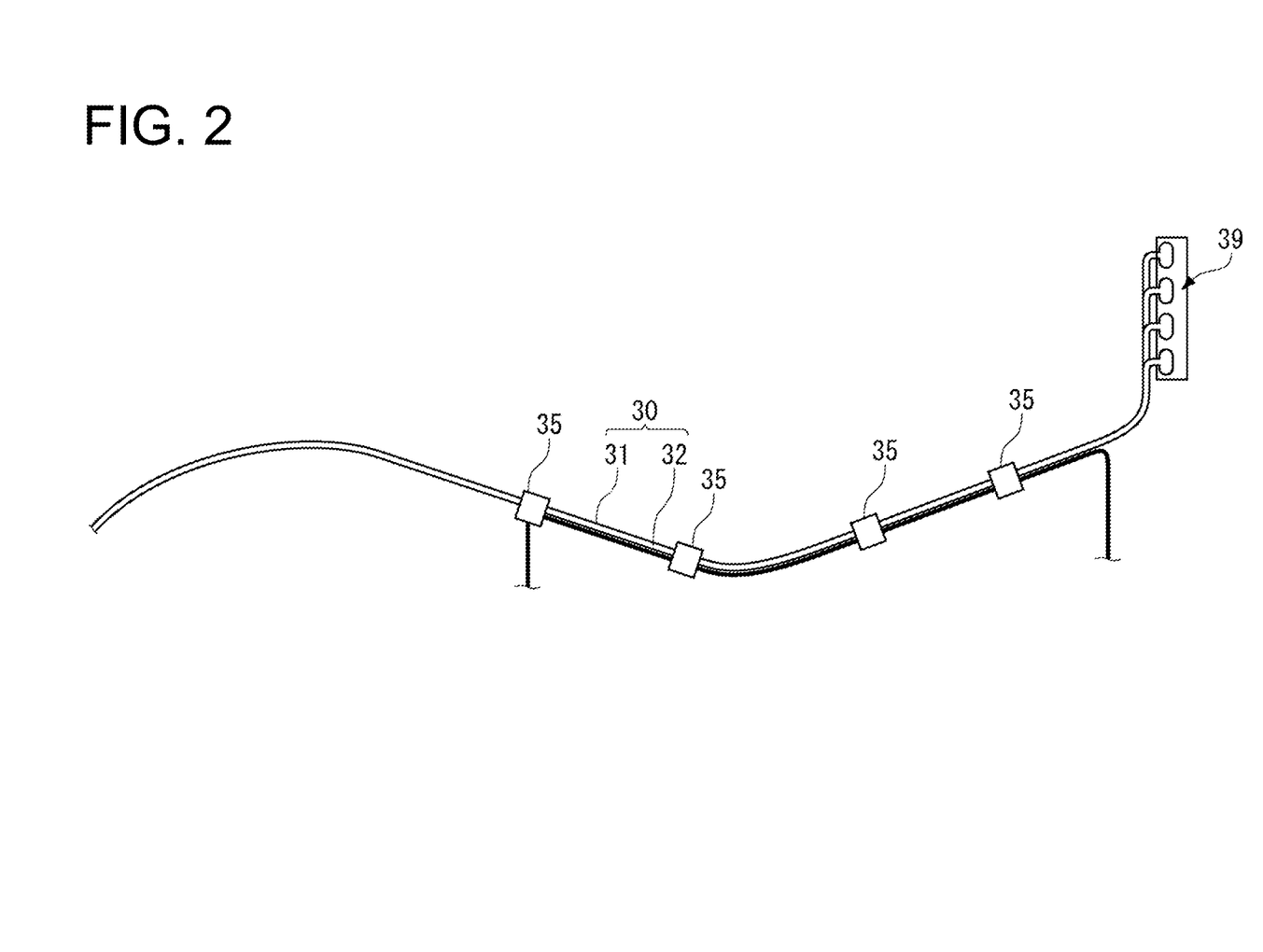
FIG. 2 is a schematic view showing a wiring path of the electric power line.

FIG. 2 schematically shows the wiring path of the electric power line 31. The wiring path includes a section of wiring inside the engine 10 and a section of wiring inside the pylon 20. FIG. 2 shows the section of wiring inside the pylon 20. The section of wiring inside the engine 10 continues from the section of wiring inside the pylon 20 to the left side of FIG. 2.

Here, if there is an electric opening in the pylon 20, the electric power line 31 may be irradiated with electromagnetic waves generated by a lightning strike on the aircraft.

In this embodiment, therefore, the influence of electromagnetic waves on the electric power line 31 is reduced by laying a GND line 32, which is grounded at both ends on the airframe, along the electric power line 31 at positions where electromagnetic shielding is required.

Figure 3:
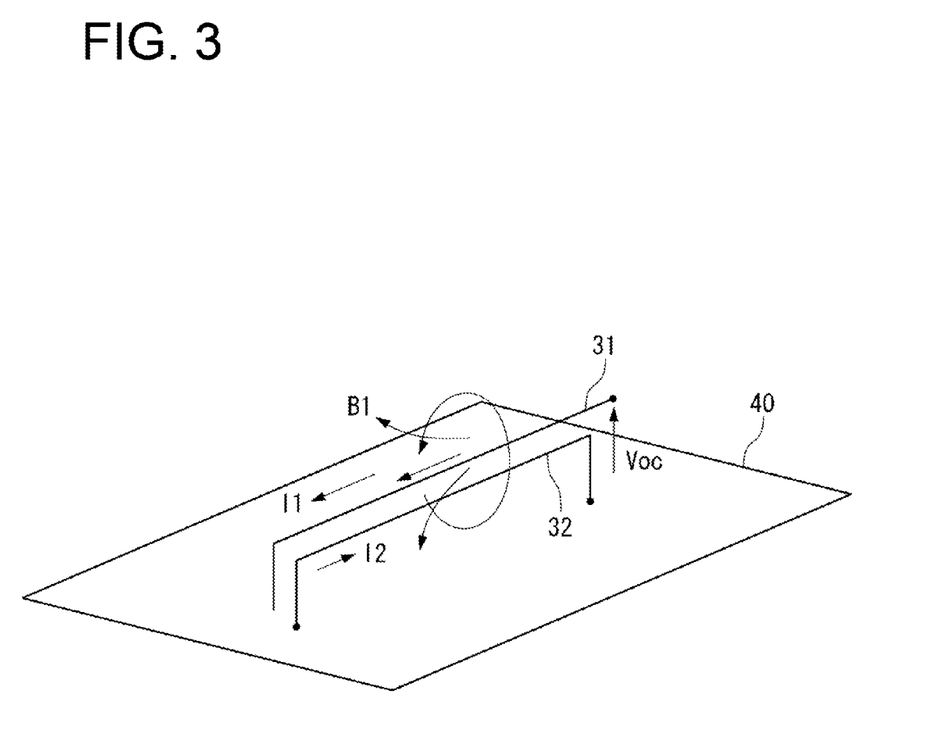
FIG. 3 is a view showing the principle explaining why the influence of electromagnetic waves can be reduced by a GND line.

The principle of reduction of the influence of electromagnetic waves through the GND line 32 is explained as follows.

A GND plane 40 shown in FIG. 3 represents the airframe which is a grounding potential. The airframe here includes the nacelle of the engine 10 and conductive parts of the pylon 20 other than the main wing 11 and the fuselage.

The main wing 11 and the engine 10 are more likely to be hit by lightning than the pylon 20 which is hidden under the main wing 11.

For example, if the engine 10 is directly hit by lightning, a strong electromagnetic field is caused near the engine 10 due to the current of the direct lightning strike. Suppose that the electric power line 31 is irradiated with electromagnetic waves radiated from this electromagnetic field and, due to electromagnetic induction, a voltage $V_{OC}$ is induced and a high induced current I1 flows through the electric power line 31.

Then, an induced electromotive force is generated in the direction of preventing increase and decrease of a magnetic flux B1 resulting from increase and decrease of the induced current I1 (Lenz's law), and an induced current I2 flows through the GND line 32 and flows out from the grounding point to the airframe (GND plane 40). The direction of the induced current I2 is determined by the direction of the magnetic flux B1 and increase/decrease of the magnetic flux B1.

Therefore, if the electric power line 31 is irradiated with electromagnetic waves, a current flows through the GND line 32 provided along the electric power line 31. As a result, increase and decrease of the magnetic flux B1 is prevented and the induced current I1 is reduced, so that an electromagnetic shielding effect can be obtained. Thus, it is possible to prevent failure of devices connected with the electric power line 31.

The specific structure of the electric power line 31 and the GND line 32 will be described with reference to FIGS. 4A to 4C.

Figure 4A:
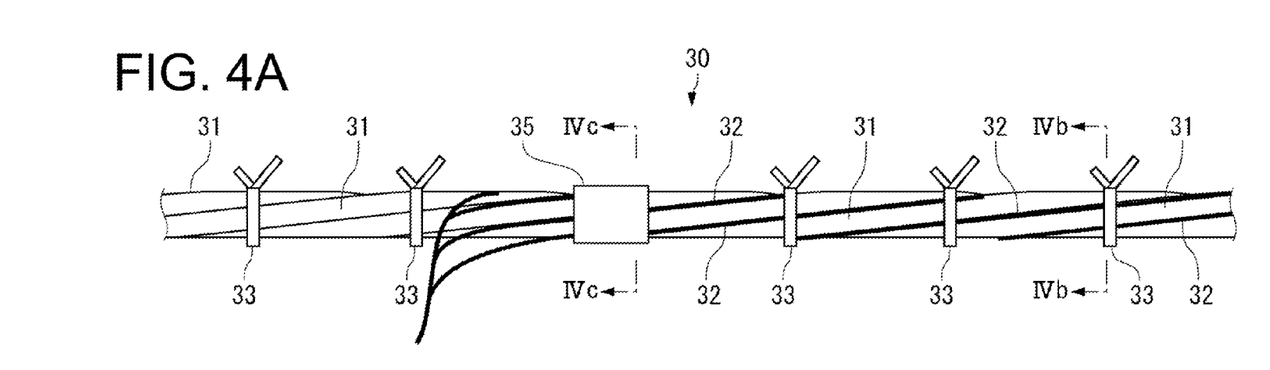
FIG. 4A is a view showing an electric wire structure including the electric power lines and the GND lines.
Figure 4B:
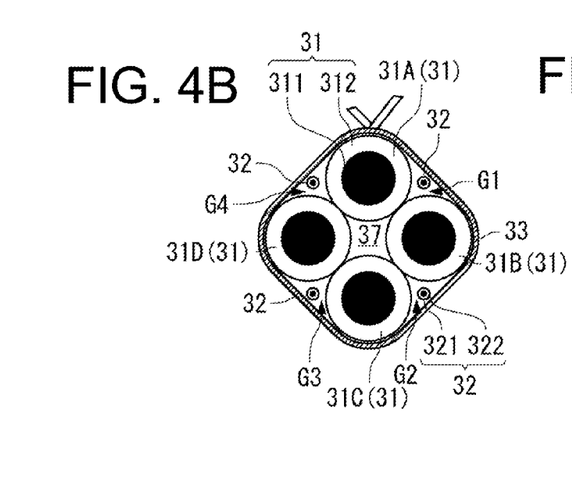
FIG. 4B is a cross-sectional view along the line IVb-IVb of FIG. 4A.
Figure 4C:
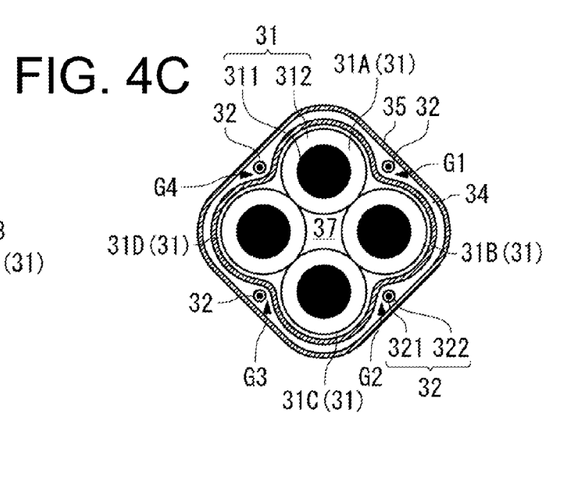
FIG. 4C is a cross-sectional view along the line IVc-IVc of FIG. 4A.

As shown in FIGS. 4B and 4C, the electric power line 31 is configured of four electric wires which are three electric wires 31A to 31C, corresponding respectively to the phases of the three-phase alternating-current power generated by the generator 12, and a neutral wire 31D connected with a reference potential of an inverter circuit.

It is also possible to configure the electric power line 31 with three electric wires without a neutral wire. In the case where single-phase alternating-current power is transmitted, the electric power line 31 is typically configured of three electric wires. The number of electric wires configuring the electric power line 31 is not limited but can be determined according to the type of generator, the required safety level, etc.

The electric wires 31A to 31D each have a core wire 311 and a coating 312 covering the outer periphery of the core wire 311. The coating 312 formed from a resin secures insulation of one core wire 311 against the core wires 311 of the other electric wires twisted together.

As shown in FIGS. 4A and 4B, these electric wires 31A to 31D are twisted together into one line and bundled by a resin bundling band 33 at a plurality of positions in the length direction.

The bundling band 33 bundles together the electric power lines 31 and the GND lines 32 for convenience of handling.

Grooves G1 to G4, which have a fan-like shape in lateral cross-section, are formed in the space surrounded by adjacent ones of the electric wires 31A to 31D and the bundling band 33. These grooves G1 to G4 continue spirally following the electric wires 31A to 31D twisted together.

As shown in FIGS. 4B and 4C, the GND line 32 includes a core wire 321 and a coating 322 covering the outer periphery of the core wire 321. The coating 322 is formed from a resin.

The coatings 322 and 312 of the core wire 321 of the GND line 32 and the core wire 311 of the electric power line 31, respectively, lie between these core wires.

The GND line 32 is disposed in each of the fan-like shape grooves G1 to G4. In this embodiment, total four GND lines 32 are provided one in each of the grooves G1 to G4. However, it is also possible to dispose two or more GND lines 32 in each of the grooves G1 to G4 (e.g., FIG. 6C).

In order to obtain a favorable electromagnetic shielding effect, it is preferable that the GND lines 32 are disposed evenly around the electric wires 31A to 31D twisted together.

As shown in FIG. 4C, a first tape 34 is wound around the electric wires 31A to 31D. The first tape 34 is provided on the inner peripheral side of the GND lines 32.

The first tape 34 is formed using silicone rubber, and it self-fuses when left for a short time with one end on top of the other.

Since the first tape 34 prevents the GND lines 32 from entering a central part 37 surrounded by the electric wires 31A to 31D and retains the GND lines 32 on the inside of the grooves G1 to G4, the electromagnetic shielding effect of the GND lines 32 can be favorably exerted.

In order to avoid the GND lines 32 entering the central part 37 over the entire length of the GND lines 32, the first tape 34 is provided at a plurality of positions at appropriate intervals.

A second tape 35, which is similarly formed using silicone rubber, is wound around the outer periphery of the first tape 34.

The first tape 34 and the second tape 35 can also be formed from low-frictional materials other than silicone rubber, for example, polytetrafluoroethylene (PTFE), polyphenylene sulfide (PPS), and polyetheretherketone (PEEK), etc.

Even when the repulsive force of the first tape 34 acts in the direction of disengaging the GND lines 32 from the grooves G1 to G4, the GND lines 32 along with the first tape 34 are pressed toward the inner peripheral side by the second tape 35. Therefore, the GND lines 32 are retained in the grooves G1 to G4. In addition, the GND lines 32 are pressed toward the inner peripheral side also by the bundling band 33.

As shown in an exaggerated manner in FIG. 4C, the first tape 34 assumes a slightly depressed shape following the outer periphery of adjacent ones of the electric wires 31A to 31D in each of the grooves G1 to G4.

The above-described bundling band 33, first tape 34, and second tape 35 are all formed from a resin which slides with low friction over the resin forming the respective coatings 312, 322 of the electric wires 31A to 31D and the GND lines 32. Therefore, the frictional resistance caused when the electric wires 31A to 31D and the GND lines 32 are bent is small, which allows easy routing of the electric wires 31A to 31D and the GND lines 32 during wiring.

It is also effective to apply a friction reducing coating to the surfaces of the bundling band 33, the first tape 34, and the second tape 35.

Figure 5:
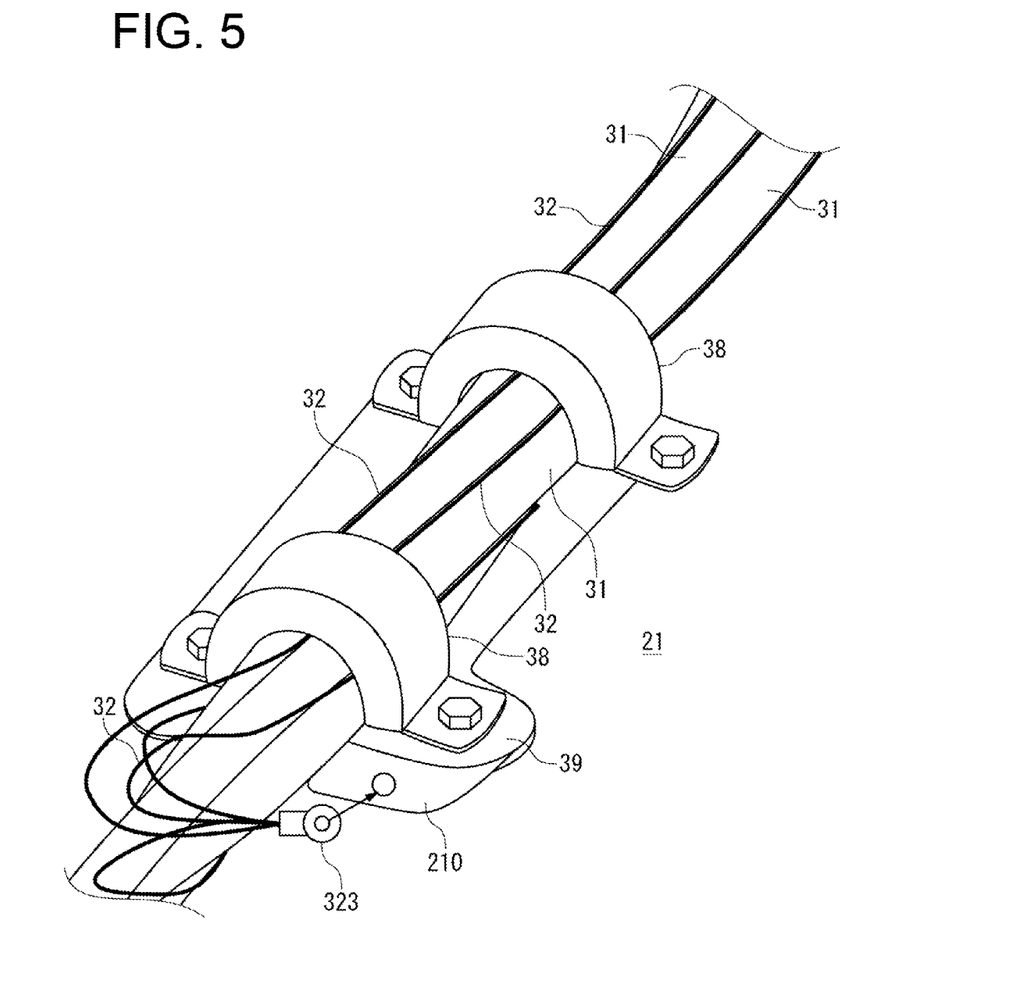
FIG. 5 is a view showing a position at which one ends of the GND lines are grounded on the airframe.

The electric wires 31A to 31D and the GND lines 32 are assembled by means of the bundling band 33, the first tape 34, and the second tape 35. Then, as shown in FIG. 5, these electric wires and the GND lines are fixed on the structural member 21 of the pylon 20 through clamps 38 at several positions in the length direction. The clamps 38 are fixed on brackets 39 provided on the structural member 21.

An electromagnetic-shielded electric wire structure 30 is configured by the above-described electric wires 31A to 31D and GND lines 32. The electromagnetic-shielded electric wire structure 30 has no sheath (jacket) which common electric wires include for integrally covering and protecting the outer peripheries of the electric wires 31A to 31D and the GND line 32.

Having no such a sheath, the electromagnetic-shielded electric wire structure 30 is highly flexible and is smaller in radius of curvature than common electric wires, which provides excellent ease of routing during wiring.

In contrast to common electric wires with a sheath, in which the wires inside the sheath are equal in length, the electric power line 31 and the GND line 32 in the electromagnetic-shielded electric wire structure 30 may be different in length. In fact, the GND lines 32 are provided in only part of the sections of the electric power line 31 in this embodiment.

As shown in FIG. 5, both ends of the GND lines 32 are connected with a grounding terminal 210 provided on the structural member 21 of the pylon 20. In FIG. 5, a crimp-type terminal 323, which is integrally provided at the ends of the core wires 321 of the four GND lines 32, is connected with the grounding terminal 210 provided on the frame 25.

A test for confirming the electromagnetic shielding effect was conducted using a frequency analyzer and an ammeter by irradiating the electromagnetic-shielded electric wire structure 30 having been described above with an electromagnetic wave simulating an electromagnetic wave upon lightning strike. The results obtained are shown in FIG. 6A.

Figure 6A:
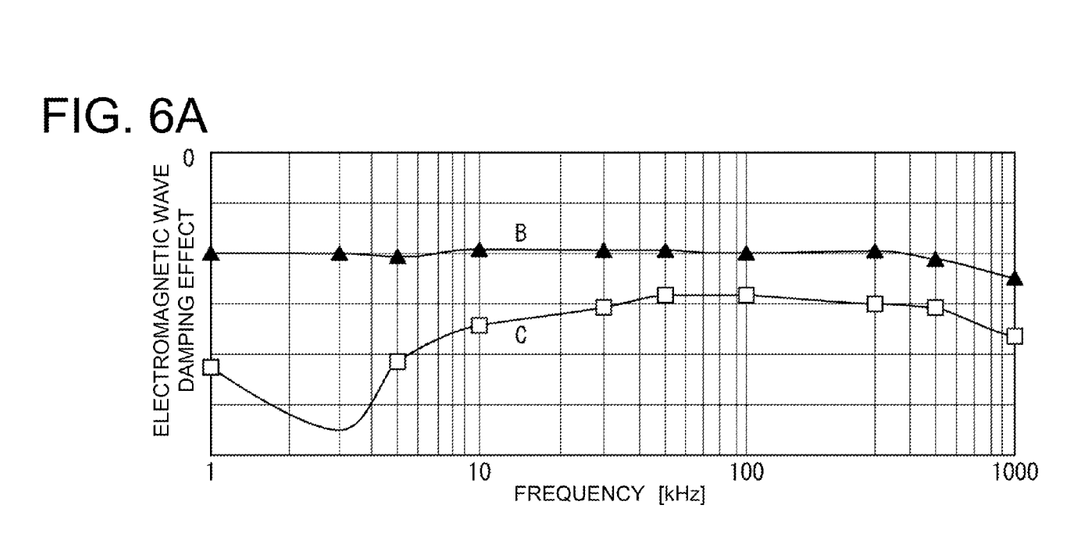
FIG. 6A is a graph showing the electromagnetic wave damping effect of the electric wire structure including the GND line.

The abscissa of the graph shown in FIG. 6A shows the frequency of the electromagnetic wave. The ordinate shows the electromagnetic wave damping effect, meaning that the effect is higher downward from zero.

Figure 6B:
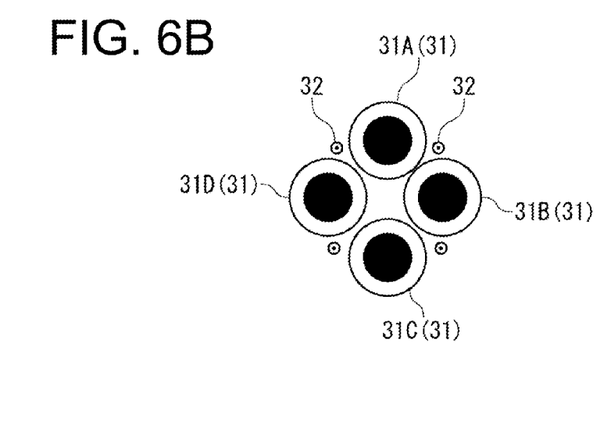
FIG. 6B is a cross-sectional view of the electric wire structure corresponding to the data indicated by B in FIG. 6A.
Figure 6C:
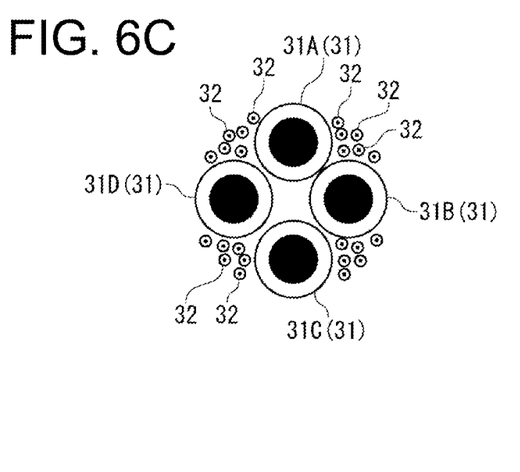
FIG. 6C is a cross-sectional view of the electric wire structure corresponding to the data indicated by C in FIG. 6A.

The data plotted with the black triangles shows a case where the GND lines 32 are disposed one in each of the grooves G1 to G4 as in the electromagnetic-shielded electric wire structure 30 of this embodiment (FIG. 6B), and the data plotted with white squares shows a case where the GND lines 32 are disposed six in each of the grooves G1 to G4 as shown in FIG. 6C.

FIG. 6A shows that the electromagnetic wave damping effect can be obtained by disposing the GND lines 32, and the effect becomes higher as the number of the GND lines 32 increases.

It is possible to gradually increase the number of GND lines 32 while checking the electromagnetic wave shielding effect.

It is also possible to dispose a single larger-diameter GND line 32 instead of disposing a plurality of GND lines 32 in the same groove.

In the following, one example of the procedure of providing the electromagnetic-shielded electric wire structure 30 will be described.

Figure 7:
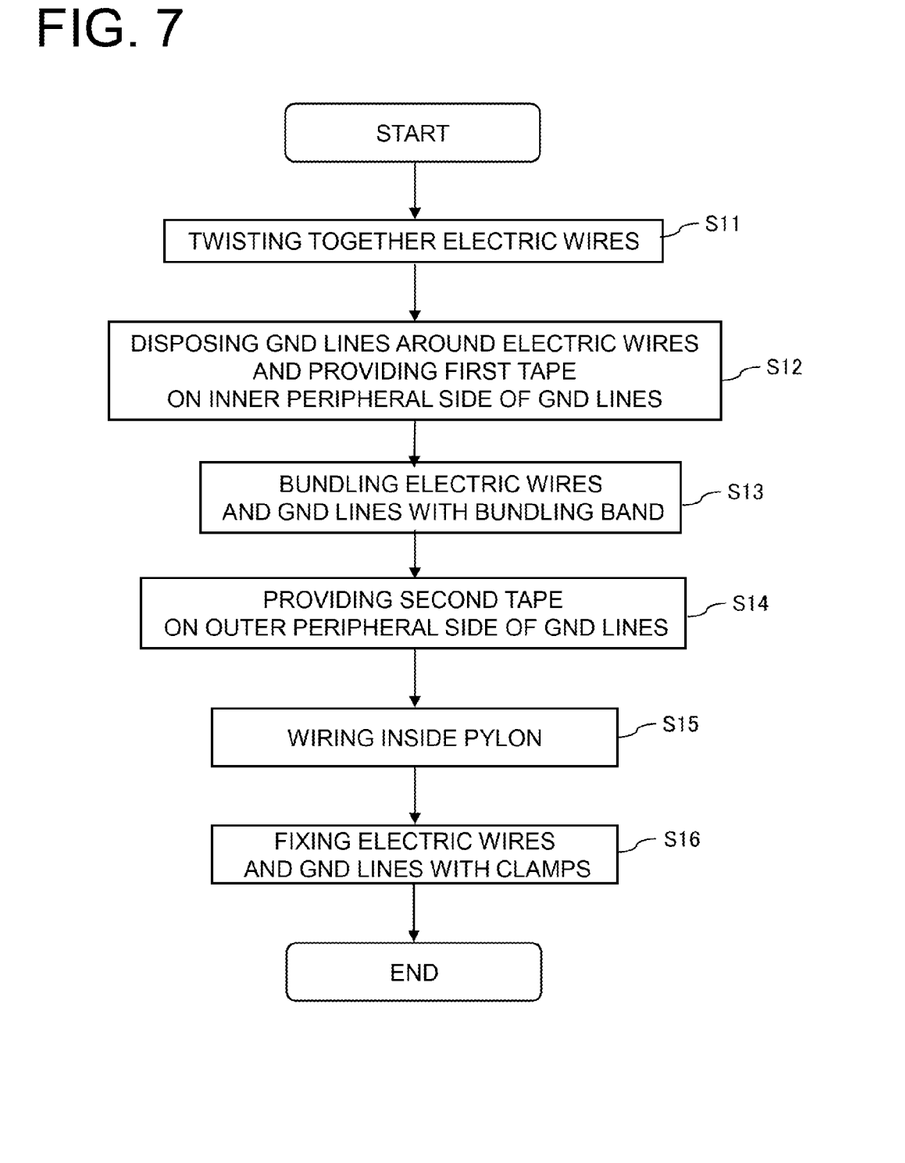
FIG. 7 is a flowchart showing the procedure of newly installing an electromagnetic-shielded electric wire structure.

The case where the electromagnetic-shielded electric wire structure 30 is newly provided will be described with reference to FIG. 7.

First, the electric wires 31A to 31D configuring the electric power line 31 are twisted together (twisting step S11). When twisted together, these wires support themselves on one another and therefore are easier to handle.

Next, the GND lines 32 are disposed in the grooves G1 to G4 formed between adjacent ones of the electric wires 31A to 31D at positions of the electric power line 31 where electromagnetic shielding is required. In this process, the GND line 32 can be disposed over the first tape 34 (on the outer peripheral side) after the first tape 34 is wound around the electric wires 31A to 31D (this is the end of a first tape/GND line disposing step S12).

Then, the electromagnetic-shielded electric wire structure 30 is bundled by the bundling band 33 (bundling step S13). The bundling band 33 is provided at a predetermined pitch except for those positions where the first and second tapes 34, 35 are provided, where the clamps 38 are provided, and where the bundling band 33 would interfere with other members.

Furthermore, the second tape 35 is wound over the first tape 34 (second tape installing step S14). As a result, the GND lines 32 are sandwiched between the first tape 34 and the second tape 35.

Next, the electromagnetic-shielded electric wire structure 30 is wired inside the pylon 20 (wiring step S15).

Since the electromagnetic-shielded electric wire structure 30 has no sheath, it is highly flexible. In addition, the bundling band 33, the first tape 34, the second tape 35, the coating 312 of the electric power line 31, and the coating 322 of the GND line 32 slide over one another with low friction.

Therefore, it is easy to perform the work of inserting the electromagnetic-shielded electric wire structure 30 into narrow parts while bending it.

Since the first tape 34 and the second tape 35 are provided, it is possible to avoid the GND lines 32 entering the central part 37 or jumping out from the grooves G1 to G4 and entering the adjacent groove during wiring.

Finally, the electromagnetic-shielded electric wire structure 30 is fixed on the wall of the pylon 20 or the rod 24 by means of the clamps 38 and the brackets 39 (clamp fixing step S16).

Thus, the installation work of the electromagnetic-shielded electric wire structure 30 is completed.

Figure 8:
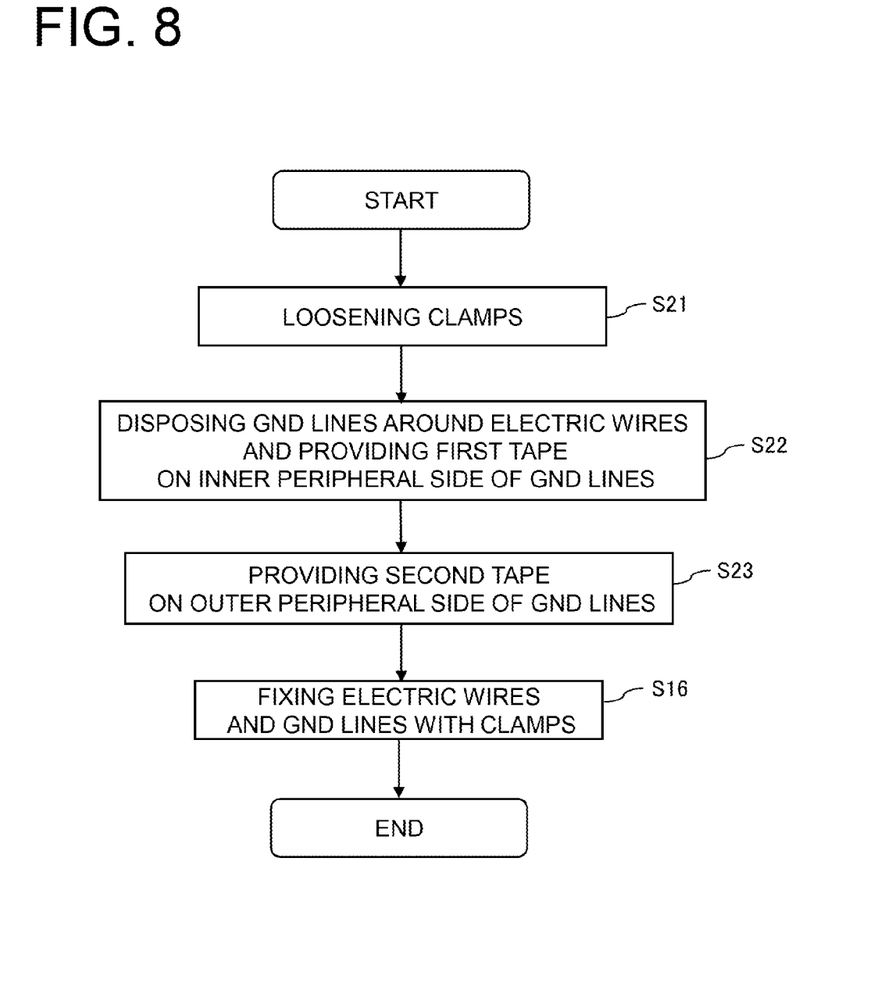
FIG. 8 is a flowchart showing the procedure of configuring the electromagnetic-shielded electric wire structure using an existing electric power line.

Next, the procedure for providing the electromagnetic-shielded electric wire structure 30 using existing electric power lines 31 provided inside the pylon 20 will be described with reference to FIG. 8.

First, if clamps 38 are provided at positions of the existing electric power lines 31 where electromagnetic shielding is required, the clamps 38 are loosened (step S21).

Then, the GND lines 32 are disposed in the grooves G1 to G4 between adjacent ones of the electric wires 31A to 31D. In this process, the GND lines 32 are inserted on the inside of the bundling band 33 bundling the existing electric power lines 31 and on the inside of the clamps 38. The GND lines 32 are disposed over the first tape 34 (on the outer peripheral side) after the first tape 34 is wound around the electric wires 31A to 31D at positions different from those of the bundling bands 33 (this is the end of a first tape/GND line disposing step S22).

In this first tape/GND line disposing step S22, part of the bundling bands 33 may be removed and replaced with the first tape 34.

Next, the second tape 35 is wound around the outer periphery of the first tape 34 (second tape installation step S23).

Finally, the clamps 38 are fastened to fix the electromagnetic-shielded electric wire structure 30 on the rod 24 inside the frame 25 (clamp fixing step S16).

Thus, the work of turning the existing electric power lines 31 into electromagnetic-shielded electric wires is completed.

The wired electromagnetic-shielded electric wire structure 30 vibrates as the airframe vibrates during flight. Here, since the electromagnetic-shielded electric wire structure 30 has no sheath, the electric power lines 31 and the GND lines 32 are not fixed integrally. Therefore, it is possible to suppress the electric wires 31A to 31D and the GND lines 32 rubbing against one another and wearing.

Even if wear occurs, since the coatings 312, 322 of the core wires 311 of the electric wires 31A to 31D and the core wire 321 of the GND line 32, respectively, lie between these core wires, it is possible to avoid short-circuit between the core wires 311, 321 resulting from the GND line 32 and the electric wires 31A to 31D rubbing against one another and wearing more reliably than in the case where only the coating 312 is provided.

According to the electromagnetic-shielded electric wire structure 30 of this embodiment, unlike the common electric wires with a sheath which are an integral structure, the electromagnetic-shielded electric wire structure 30 has no sheath and is therefore lightweight. In addition, since it has no sheath, the electric wires 31A to 31D and the plurality of GND lines 32 can be handled individually.

Therefore, it is possible to dispose only the minimum number of GND lines 32 required to obtain the electromagnetic shielding effect around the electric wires 31A to 31D in the minimum number of sections where it is necessary to reduce the influence of electromagnetic waves. Thus, it is possible to give an electromagnetic shielding effect to the electric power line 31 while minimizing the weight.

According to the electromagnetic-shielded electric wire structure 30, not only the above-described electromagnetic waves due to lightning but also electromagnetic waves emitted from a radar of an airport control tower or electronic devices installed in an aircraft can be prevented from affecting the electrical system connected with the electric power line 31. It is also possible to prevent the electric power line 31 from radiating electromagnetic waves and affecting wiring and devices disposed near the electric power line 31.

In this embodiment, the GND lines 32 are provided only in those sections of the electric power line 31 which are likely to be exposed to electromagnetic waves through the pylon fairing 22. This makes it possible to form the pylon fairing 22 from a fiber-reinforced resin such as glass fiber reinforced plastics (GFRP), and thereby achieve a significant weight reduction compared with the case where the pylon fairing 22 is formed from a metal material.

Since the electromagnetic-shielded electric wire structure 30 has no sheath and is hence highly flexible, the ease of routing can be improved compared with the common electric wires with a sheath.

This electric wire structure 30 can meet the high requirement for the ease of routing in an aircraft by being wired so as to thread through narrow clearances of a large number of pieces of equipment of an aircraft.

Moreover, since the electromagnetic-shielded electric wire structure 30 has no sheath and the elements (electric wires 31A to 31D and the GND lines 32) can be handled individually, it is possible to add the GND lines 32 to the existing electric power lines 31 to turn them into electromagnetic-shielded electric wires as described with reference to FIG. 8.

If one removes the existing electric power line 31 and newly design and lay an electromagnetic-shielded electric wire, one would have a hard time removing the electric power line 31 by sorting it out from other wires running on the same path and also have to obtain the approval of the Civil Aviation Bureau. In addition, the newly introduced electromagnetic-shielded electric wire has typically a larger diameter than the original electric power line 31 due to the addition of electromagnetic shielding parts and the sheath which integrates and protects the electromagnetic shielding parts and the electric wires, so that the diameter of the electromagnetic-shielded electric wire does not match the diameter of the clamp 38, which has been used for the electric power line 31, and all the clamps 38 and the brackets 39 need to be replaced.

According to this embodiment, by contrast, it is possible to configure the electromagnetic-shielded electric wire structure 30 by combining the already approved electric power lines 31 and the GND lines 32 without removing the existing electric power lines 31, and the approval of the Civil Aviation Bureau is easy to obtain. Moreover, since the GND lines 32 are accommodated inside the grooves G1 to G4 and cause no increase in diameter of the electromagnetic-shielded electric wire structure 30 compared with the diameter of the electric wires 31A to 31D twisted together, the same clamps 38 and brackets 39 can be used as they are.

Thus, it is easy to provide the existing electric power lines 31 with measures against electromagnetic waves.

While giving an electromagnetic shielding effect to the electric power line 31 has been described in the embodiment above, an electromagnetic shielding effect can also be given to a signal line, which transmits detection signals from sensors, control signals from controllers, etc., by disposing the GND lines 32 around the signal line.

The present invention is not limited to the above-described examples, but it is possible to make a selection of the configurations presented in the above-described embodiment or to appropriately change one configuration into another within the scope of the present invention.

Since the bundling band 33 and the second tape 35 both function to bundle the electric power lines 31 and the GND lines 32, they can substitute for each other. Therefore, for example, it is possible to provide the second tape 35 at a predetermined pitch without providing the bundling band 33. In that case, the first tape 34 should be provided on the inner peripheral side of the GND lines 32 at all the positions or some of the positions where the second tape 35 is provided.

In the above-described embodiment, the role of pressing the GND lines 32 toward the inner peripheral side against the repulsive force of the first tape 34 is fulfilled by the second tape 35 and is also supplemented by the bundling band 33. Therefore, it is acceptable to reserve the first tape 34 and the bundling band 33 while omitting the second tape 35 in the above-described embodiment.

Furthermore, it is possible to connect one end of the first tape 34 in the length direction with one end of the second tape 35 in the length direction to configure one member (tape).

In that case, the GND lines 32 should be disposed on the tape which is wound once around the electric wires, and thereafter the tape should be wound once again to cover the GND lines 32.

Figure 9A:
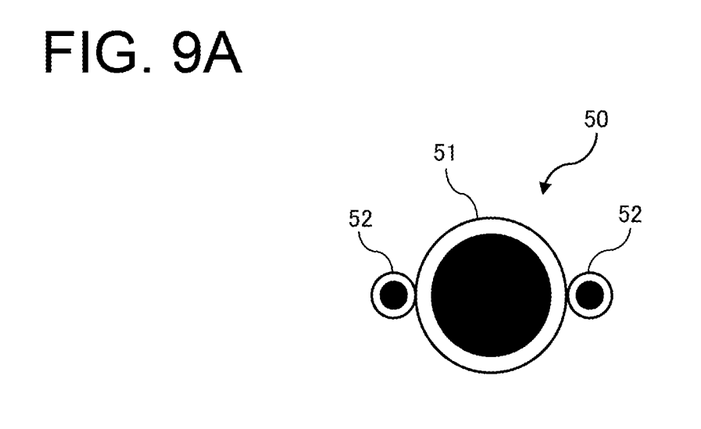
FIGS. 9A and 9B are views showing a modified example of the present invention.
Figure 9B:
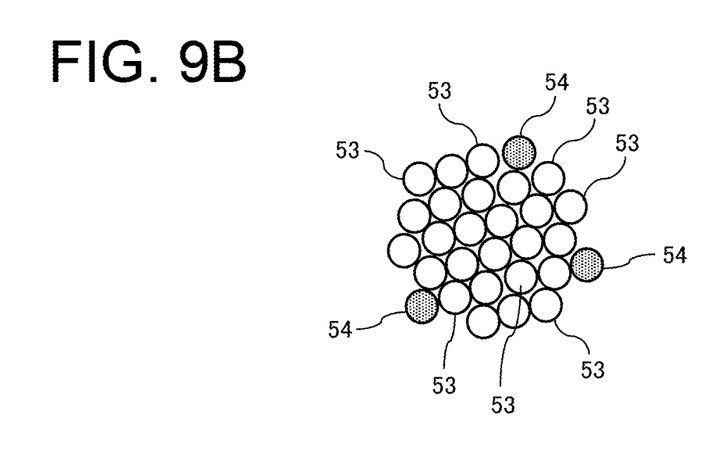

FIGS. 9A and 9B show modified examples of the present invention.

In FIG. 9A, two GND lines 52 are disposed around one electric wire 51. While not shown, the electric wire 51 and the GND lines 52 are bundled not through a sheath but directly by a bundling member. As with the electric wire structure 30 of the above-described embodiment, an electric wire structure 50 including these electric wire 51, the GND lines 52, and the bundling member has no sheath for integrally covering these elements. Therefore, the same advantages as those of the above-described embodiment can be obtained.

In FIG. 9B, a plurality of GND lines 54 are disposed around a plurality of signal lines 53. The signal lines 53 and the GND lines 54 are bundled not through a sheath but directly by a bundling member (not shown), and also in this example, no sheath for integrally covering these elements is provided.

Here, an electromagnetic-shielded electric wire having a metal braid etc. disposed around the core wire may be included in the plurality of signal lines 53. In that case, the rest of the signal lines 53 are shielded against electromagnetic waves by the electromagnetic-shielded electric wire and the GND lines 54.

The electromagnetic-shielded electric wire of the present invention is applicable not only to the aircraft pylon 20 but also to electric wires provided at any positions where electromagnetic shielding is required.

Moreover, the present invention is also applicable to electric wires provided in devices, machines, and structures other than aircrafts.

What is claimed is:

1. An electric wire structure comprising:
a plurality of electric wires;
a single or plurality of individual GND members which are disposed generally parallel to the electric wires and are grounded at both ends, wherein the GND member is a GND line as a conductive wire extending along the electric wire and the plurality of electric wires are twisted together and the GND lines are disposed inside grooves which are formed between adjacent ones of the plurality of electric wires; and
a bundling member for directly bundling the electric wires and the GND members which are not covered integrally by a jacket.

2. The electric wire structure according to claim 1, wherein the GND line has a core wire and an insulative coating covering the outer periphery of the core wire.

3. The electric wire structure according to claim 1, further comprising a string-shaped or belt-shaped first winding part which is wound around the plurality of electric wires on the inner peripheral side of the GND lines.

4. The electric wire structure according to claim 3, further comprising a string-shaped or belt-shaped second winding part which is wound around the electric wires and the GND lines.

5. The electric wire structure according to claim 4, wherein at least one of the first winding part and the second winding part is formed using silicone rubber.

6. The electric wire structure according to claim 1, wherein the electric wire structure is provided in an aircraft.

7. An aircraft engine pylon comprising:
a structural member for supporting an aircraft engine on a main wing;
a pylon fairing covering the structural member; and
the electric wire structure according to claim 1, wherein the electric wire structure is provided in the structural member on the inside of the pylon fairing.

8. The aircraft engine pylon according to claim 7, wherein the pylon fairing is formed from a fiber-reinforced resin containing glass fiber.

9. The aircraft engine pylon according to claim 8, wherein a mesh formed from a metal material is provided on the surface of the pylon fairing.

10. The electric wire structure according to claim 1, wherein the electric wire is an electric power line which transmits electric power generated by a generator equipped in an aircraft engine via an engine pylon supporting the engine on a main wing.

11. The electric wire structure according to claim 1, wherein each one of the plurality of electric wires consists of a core wire and a coating covering an outer periphery of the core wire.

12. An electric wire structure comprising:
a plurality of electric wires;
a single or plurality of GND members which are disposed around the electric wires along the electric wires and are grounded at both ends, wherein the GND member is a GND line as a conductive wire extending along the electric wire;
a bundling member for directly bundling the electric wires and the GND members which are not covered integrally by a jacket;
a string-shaped or belt-shaped first winding part which is wound around the plurality of electric wires on the inner peripheral side of the GND lines; and
a string-shaped or belt-shaped second winding part which is wound around the electric wires and the GND lines wherein
the plurality of electric wires are twisted together, and the GND lines are disposed inside grooves which are formed between adjacent ones of the plurality of electric wires, and wherein the second winding part is lapped over the outer periphery of the first winding part.

13. A method for electromagnetic shielding of an electric wire including:
- a first step of disposing a single or plurality of individual GND members, which are grounded at both ends, generally parallel to a plurality of electric wires, wherein the GND member is a GND line as a conductive wire extending along the electric wire and the plurality of electric wires are twisted together and the GND lines are disposed inside grooves which are formed between adjacent ones of the plurality of electric wires; and
- a second step of directly bundling the electric wires and the GND members, which are not covered integrally by a jacket, with a bundling member.

14. The method for electromagnetic shielding of an electric wire according to claim 13, wherein, in the first step, the GND line is used which has a core wire and an insulative coating covering the outer periphery of the core wire.

15. The method for electromagnetic shielding of an electric wire according to claim 13, wherein, in the first step or prior to the first step, a string-shaped or belt-shaped first winding part, which is wound around the plurality of electric wires, is provided on the inner peripheral side of the GND lines.

16. The method for electromagnetic shielding of an electric wire according to claim 15, further including a third step of winding a string-shaped or belt-shaped second winding part around the electric wires and the GND lines.

17. The method for electromagnetic shielding of an electric wire according to claim 13, wherein the first step is performed on an existing electric wire.

18. The method for electromagnetic shielding of an electric wire according to claim 13, wherein the electric wire is provided in an aircraft.

19. The method for electromagnetic shielding of an electric wire according to claim 13, wherein each one of the plurality of electric wires consists of a core wire and a coating covering an outer periphery of the core wire.

* * * * *